United States Patent    (10) Patent No.: US 11,115,382 B2
Bansal et al.                   (45) Date of Patent:      Sep. 7, 2021

(54) GLOBAL OBJECTS FOR FEDERATED FIREWALL RULE MANAGEMENT

(71) Applicant: Nicira, Inc., Palo Alto, CA (US)

(72) Inventors: Kaushal Bansal, Sunnyvale, CA (US); Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 870 days.

(21) Appl. No.: 15/197,652

(22) Filed: Jun. 29, 2016

(65) Prior Publication Data

US 2017/0005988 A1    Jan. 5, 2017

Related U.S. Application Data

(60) Provisional application No. 62/187,123, filed on Jun. 30, 2015.

(51) Int. Cl.
*H04L 29/06*    (2006.01)
*H04L 12/24*    (2006.01)
(Continued)

(52) U.S. Cl.
CPC .......... *H04L 63/0218* (2013.01); *G06F 9/445* (2013.01); *G06F 9/455* (2013.01);
(Continued)

(58) Field of Classification Search
CPC ... H04L 63/0263; H04L 63/029; G06F 8/314; G06F 9/06
See application file for complete search history.

(56) References Cited

U.S. PATENT DOCUMENTS 5,581,722 A    12/1996 Welland
5,968,176 A    10/1999 Nessett et al.
(Continued)

FOREIGN PATENT DOCUMENTS

EP    2748750 A1    7/2014
JP    2003188906 A    7/2003
(Continued)

OTHER PUBLICATIONS

Joseph, Herndon, *FairWarning IP, LLC v. Iatric Systems, Inc.* (Fed. Cir. 2016), Oct. 13, 2016, Patent Doc, pp. 1-3.*
(Continued)

*Primary Examiner* — Ellen Tran
(74) *Attorney, Agent, or Firm* — Adeli LLP

(57) ABSTRACT

A method of defining distributed firewall rules in a group of datacenters is provided. Each datacenter includes a group of data compute nodes (DCNs). The method sends a set of security tags from a particular datacenter to other datacenters. The method, at each datacenter, associates a unique identifier of one or more DCNs of the datacenter to each security tag. The method associates one or more security tags to each of a set of security group at the particular datacenter and defines a set of distributed firewall rules at the particular datacenter based on the security tags. The method sends the set of distributed firewall rules from the particular datacenter to other datacenters. The method, at each datacenter, translates the firewall rules by mapping the unique identifier of each DCN in a distributed firewall rule to a corresponding static address associated with the DCN.

21 Claims, 11 Drawing Sheets

(51) Int. Cl.
*G06F 16/25* (2019.01)
*G06F 16/27* (2019.01)
*G06F 9/455* (2018.01)
*H04L 29/08* (2006.01)
*G06F 9/445* (2018.01)
*G06F 12/0813* (2016.01)

(52) U.S. Cl.
CPC ...... *G06F 9/45533* (2013.01); *G06F 9/45558* (2013.01); *G06F 12/0813* (2013.01); *G06F 16/25* (2019.01); *G06F 16/27* (2019.01); *H04L 41/0846* (2013.01); *H04L 41/0893* (2013.01); *H04L 63/0227* (2013.01); *H04L 63/0263* (2013.01); *H04L 63/20* (2013.01); *H04L 67/1002* (2013.01); *H04L 67/1095* (2013.01); *H04L 67/2852* (2013.01); *G06F 2009/4557* (2013.01); *G06F 2212/154* (2013.01); *G06F 2212/60* (2013.01); *G06F 2212/62* (2013.01)

(56) References Cited

U.S. PATENT DOCUMENTS

| | | | |
|---|---|---|---|
| 6,154,775 | A | 11/2000 | Coss et al. |
| 6,219,786 | B1 | 4/2001 | Cunningham et al. |
| 6,496,935 | B1 | 12/2002 | Fink et al. |
| 6,600,744 | B1 | 7/2003 | Carr et al. |
| 6,708,187 | B1 | 3/2004 | Shanumgam et al. |
| 6,880,089 | B1 | 4/2005 | Bommareddy et al. |
| 7,032,022 | B1 | 4/2006 | Shanumgam et al. |
| 7,055,173 | B1 | 5/2006 | Chaganty et al. |
| 7,106,756 | B1 | 9/2006 | Donovan et al. |
| 7,227,842 | B1 | 6/2007 | Ji et al. |
| 7,349,382 | B2 | 3/2008 | Marimuthu et al. |
| 7,657,887 | B2 | 2/2010 | Kothandaraman et al. |
| 7,676,836 | B2 | 3/2010 | Prigent et al. |
| 7,724,740 | B1 | 5/2010 | Wang et al. |
| 7,818,452 | B2 | 10/2010 | Matthews et al. |
| 7,831,826 | B2 | 11/2010 | Koti et al. |
| 7,894,480 | B1 | 2/2011 | Wang et al. |
| 7,948,986 | B1 | 5/2011 | Ghosh et al. |
| 7,954,143 | B2 | 5/2011 | Aaron |
| 8,032,933 | B2 | 10/2011 | Turley et al. |
| 8,065,725 | B2 | 11/2011 | Zheng et al. |
| 8,190,767 | B1 | 5/2012 | Maufer et al. |
| 8,365,294 | B2 | 1/2013 | Ross |
| 8,578,500 | B2 * | 11/2013 | Long .................. G06F 21/55 726/22 |
| 8,621,552 | B1 | 12/2013 | Lotem et al. |
| 8,660,129 | B1 | 2/2014 | Brendel et al. |
| 8,813,209 | B2 | 8/2014 | Bhattacharya et al. |
| 8,904,511 | B1 | 12/2014 | O'neill et al. |
| 9,015,823 | B2 | 4/2015 | Koponen et al. |
| 9,047,109 | B1 | 6/2015 | Wang et al. |
| 9,130,901 | B2 | 9/2015 | Lee |
| 9,154,462 | B2 | 10/2015 | Grimes et al. |
| 9,215,210 | B2 | 12/2015 | Raman et al. |
| 9,215,213 | B2 | 12/2015 | Bansal et al. |
| 9,215,214 | B2 | 12/2015 | Bansal et al. |
| 9,276,904 | B2 | 3/2016 | Bansal et al. |
| 9,367,257 | B2 | 6/2016 | Hamilton et al. |
| 9,369,431 | B1 | 6/2016 | Kirby et al. |
| 9,479,464 | B1 | 10/2016 | Wang et al. |
| 9,553,806 | B2 | 1/2017 | Anand |
| 9,614,748 | B1 * | 4/2017 | Battersby ............ H04L 63/0272 |
| 9,621,516 | B2 * | 4/2017 | Basak ................. H04L 63/0263 |
| 9,680,706 | B2 | 6/2017 | Masurekar et al. |
| 9,755,903 | B2 | 9/2017 | Masurekar et al. |
| 9,774,707 | B2 | 9/2017 | Parthasarathy et al. |
| 9,806,948 | B2 | 10/2017 | Masurekar et al. |
| 9,860,279 | B2 | 1/2018 | Jain et al. |
| 9,894,103 | B2 | 2/2018 | Kwok et al. |
| 9,906,560 | B2 | 2/2018 | Jain et al. |
| 9,906,561 | B2 | 2/2018 | Jain et al. |
| 9,906,562 | B2 | 2/2018 | Jain et al. |
| 2002/0078370 | A1 | 6/2002 | Tahan |
| 2003/0041266 | A1 | 2/2003 | Ke et al. |
| 2003/0093481 | A1 | 5/2003 | Mitchell et al. |
| 2003/0120955 | A1 | 6/2003 | Bartal et al. |
| 2003/0126468 | A1 | 7/2003 | Markham |
| 2003/0226027 | A1 | 12/2003 | Marquet et al. |
| 2004/0049701 | A1 | 3/2004 | Le Pennec et al. |
| 2004/0177276 | A1 | 9/2004 | Mackinnon et al. |
| 2004/0223495 | A1 | 11/2004 | Pachl |
| 2004/0243835 | A1 | 12/2004 | Terzis et al. |
| 2005/0190909 | A1 | 9/2005 | Yoneyama et al. |
| 2005/0198125 | A1 | 9/2005 | Macleod Beck et al. |
| 2005/0210291 | A1 | 9/2005 | Miyawaki et al. |
| 2005/0276262 | A1 | 12/2005 | Schuba et al. |
| 2005/0278431 | A1 | 12/2005 | Goldschmidt et al. |
| 2006/0013136 | A1 | 1/2006 | Goldschmidt et al. |
| 2006/0129808 | A1 | 6/2006 | Koti et al. |
| 2006/0168213 | A1 | 7/2006 | Richardson et al. |
| 2006/0195896 | A1 | 8/2006 | Fulp et al. |
| 2007/0028291 | A1 | 2/2007 | Brennan et al. |
| 2007/0061492 | A1 | 3/2007 | Van Riel |
| 2007/0118893 | A1 | 5/2007 | Crawford |
| 2007/0136813 | A1 | 6/2007 | Wong |
| 2008/0072305 | A1 | 3/2008 | Casado et al. |
| 2008/0082977 | A1 | 4/2008 | Araujo et al. |
| 2008/0115190 | A1 | 5/2008 | Aaron |
| 2008/0148382 | A1 | 6/2008 | Bartholomy et al. |
| 2008/0189769 | A1 | 8/2008 | Casado et al. |
| 2008/0215518 | A1 | 9/2008 | Matsuda |
| 2008/0267177 | A1 | 10/2008 | Johnson et al. |
| 2008/0289028 | A1 | 11/2008 | Jansen et al. |
| 2008/0298274 | A1 | 12/2008 | Takashige et al. |
| 2009/0007219 | A1 | 1/2009 | Abzarian et al. |
| 2009/0007251 | A1 | 1/2009 | Abzarian et al. |
| 2009/0083727 | A1 | 3/2009 | Fu et al. |
| 2009/0129271 | A1 | 5/2009 | Ramankutty et al. |
| 2009/0150521 | A1 | 6/2009 | Tripathi |
| 2009/0228972 | A1 | 9/2009 | Bandi et al. |
| 2009/0235325 | A1 | 9/2009 | Dimitrakos et al. |
| 2009/0249436 | A1 | 10/2009 | Coles et al. |
| 2009/0249438 | A1 | 10/2009 | Litvin et al. |
| 2009/0249470 | A1 | 10/2009 | Litvin et al. |
| 2009/0249472 | A1 * | 10/2009 | Litvin .................. H04L 63/0263 726/14 |
| 2009/0276771 | A1 | 11/2009 | Nickolov et al. |
| 2009/0327198 | A1 | 12/2009 | Farah |
| 2009/0327781 | A1 | 12/2009 | Tripathi |
| 2010/0037310 | A1 | 2/2010 | Turley et al. |
| 2010/0037311 | A1 | 2/2010 | He et al. |
| 2010/0037331 | A1 | 2/2010 | Blake et al. |
| 2010/0043067 | A1 | 2/2010 | Varadhan et al. |
| 2010/0100616 | A1 | 4/2010 | Bryson et al. |
| 2010/0100949 | A1 | 4/2010 | Sonwane et al. |
| 2010/0125667 | A1 | 5/2010 | Soundararajan |
| 2010/0180331 | A1 | 7/2010 | Murakami et al. |
| 2010/0192215 | A1 | 7/2010 | Yaxuan et al. |
| 2010/0333165 | A1 * | 12/2010 | Basak .................. H04L 63/0263 726/1 |
| 2011/0016467 | A1 | 1/2011 | Kane |
| 2011/0022695 | A1 | 1/2011 | Dalal et al. |
| 2011/0055916 | A1 | 3/2011 | Ahn |
| 2011/0072486 | A1 | 5/2011 | Hadar et al. |
| 2011/0103259 | A1 | 5/2011 | Aybay et al. |
| 2011/0113467 | A1 | 5/2011 | Agarwal et al. |
| 2011/0154470 | A1 | 6/2011 | Grimes et al. |
| 2011/0213875 | A1 | 9/2011 | Ferris et al. |
| 2011/0246637 | A1 | 10/2011 | Murakami |
| 2011/0302647 | A1 | 12/2011 | Bhattacharya et al. |
| 2012/0042033 | A1 | 2/2012 | Ayala, Jr. et al. |
| 2012/0137199 | A1 | 5/2012 | Liu |
| 2012/0180104 | A1 | 7/2012 | Gronich et al. |
| 2012/0240182 | A1 | 9/2012 | Narayanaswamy et al. |
| 2012/0263049 | A1 | 10/2012 | Venkatachalapathy et al. |
| 2012/0291024 | A1 | 11/2012 | Barabash et al. |
| 2012/0314617 | A1 | 12/2012 | Erichsen et al. |
| 2013/0007740 | A1 | 1/2013 | Kikuchi et al. |
| 2013/0019277 | A1 | 1/2013 | Chang et al. |
| 2013/0031544 | A1 | 1/2013 | Sridharan et al. |

(56) References Cited

U.S. PATENT DOCUMENTS

| | | |
|---|---|---|
| 2013/0047151 A1 | 2/2013 | Sridharan et al. |
| 2013/0073743 A1 | 3/2013 | Ramasamy et al. |
| 2013/0074066 A1 | 3/2013 | Sanzgiri et al. |
| 2013/0125230 A1 | 5/2013 | Koponen et al. |
| 2013/0163594 A1 | 6/2013 | Sharma et al. |
| 2013/0198355 A1 | 8/2013 | Kalyanaraman et al. |
| 2013/0219384 A1 | 8/2013 | Srinivasan et al. |
| 2013/0227097 A1 | 8/2013 | Yasuda et al. |
| 2013/0227550 A1 | 8/2013 | Weinstein et al. |
| 2013/0311358 A1 | 11/2013 | Sethi et al. |
| 2013/0311612 A1 | 11/2013 | Dickinson |
| 2013/0332983 A1 | 12/2013 | Koorevaar et al. |
| 2014/0068602 A1 | 3/2014 | Gember et al. |
| 2014/0108319 A1 | 4/2014 | Klauser et al. |
| 2014/0115578 A1 | 4/2014 | Cooper et al. |
| 2014/0149794 A1 | 5/2014 | Shetty et al. |
| 2014/0195666 A1 | 7/2014 | Dumitriu et al. |
| 2014/0245423 A1 | 8/2014 | Lee |
| 2014/0281030 A1 | 9/2014 | Cui et al. |
| 2014/0282855 A1 | 9/2014 | Clark et al. |
| 2014/0282889 A1 | 9/2014 | Ishaya et al. |
| 2014/0297780 A1 | 10/2014 | Zhou et al. |
| 2014/0304387 A1 | 10/2014 | Bansal et al. |
| 2014/0325037 A1 | 10/2014 | Elisha |
| 2015/0052521 A1 | 2/2015 | Raghu |
| 2015/0112933 A1 | 4/2015 | Satapathy |
| 2015/0193466 A1 | 7/2015 | Luft |
| 2015/0200816 A1 | 7/2015 | Yung et al. |
| 2015/0229641 A1 | 8/2015 | Sun et al. |
| 2015/0277949 A1* | 10/2015 | Loh .................. G06F 9/45558 711/152 |
| 2016/0050117 A1 | 2/2016 | Voellmy et al. |
| 2016/0050141 A1 | 2/2016 | Wu et al. |
| 2016/0094456 A1 | 3/2016 | Jain et al. |
| 2016/0094643 A1 | 3/2016 | Jain et al. |
| 2016/0105333 A1 | 4/2016 | Lenglet et al. |
| 2016/0112374 A1 | 4/2016 | Branca |
| 2016/0149863 A1 | 5/2016 | Walker et al. |
| 2016/0156591 A1 | 6/2016 | Zhou et al. |
| 2016/0182454 A1 | 6/2016 | Phonsa et al. |
| 2016/0191466 A1 | 6/2016 | Pernicha |
| 2016/0191570 A1 | 6/2016 | Bansal et al. |
| 2016/0241702 A1 | 8/2016 | Gorajala Chandra et al. |
| 2017/0004192 A1 | 1/2017 | Masurekar et al. |
| 2017/0005867 A1 | 1/2017 | Masurekar et al. |
| 2017/0005987 A1 | 1/2017 | Masurekar et al. |
| 2017/0026283 A1 | 1/2017 | Williams et al. |
| 2017/0064749 A1 | 3/2017 | Jain et al. |
| 2017/0104720 A1 | 4/2017 | Bansal et al. |
| 2017/0134422 A1 | 5/2017 | Shieh et al. |
| 2017/0180319 A1 | 6/2017 | Nimmagadda et al. |
| 2017/0180320 A1 | 6/2017 | Nimmagadda et al. |
| 2017/0180321 A1 | 6/2017 | Nimmagadda et al. |
| 2017/0180423 A1 | 6/2017 | Nimmagadda et al. |
| 2017/0187679 A1 | 6/2017 | Basak et al. |
| 2017/0250869 A1 | 8/2017 | Voellmy |
| 2017/0317928 A1 | 11/2017 | Gude et al. |
| 2017/0317976 A1 | 11/2017 | Chalvadi et al. |
| 2017/0317977 A1 | 11/2017 | Popuri et al. |
| 2017/0317979 A1 | 11/2017 | Bansal et al. |
| 2017/0318055 A1 | 11/2017 | Popuri et al. |
| 2018/0007000 A1 | 1/2018 | Bansal et al. |
| 2018/0007007 A1 | 1/2018 | Bansal et al. |
| 2018/0007008 A1 | 1/2018 | Bansal et al. |

FOREIGN PATENT DOCUMENTS

| | | |
|---|---|---|
| JP | 2006040274 A | 2/2006 |
| JP | 2009017269 A | 1/2009 |
| JP | 2013012865 A | 1/2013 |
| KR | 20080100620 A | 11/2008 |
| WO | 2008095010 A1 | 8/2008 |
| WO | 2013074828 A1 | 5/2013 |

OTHER PUBLICATIONS

Author Unknown, "Enabling Service Chaining on Cisco Nexus 1000V Series," Month Unknown, 2012, 25 pages, Cisco.

Author Unknown, "Next-Generation Firewalls," Oct. 1, 2013, 1 page, Palo Alto Networks.

Basak, Debashis, et al., "Virtualizing Networking and Security in the Cloud," Month Unknown, 2010, 9 pages, VMware.com.

Casado, Martin, et al., "SANE: A Protection Architecture for Enterprise Networks," Proceedings of the 15th USENIX Security Symposium, Jul. 31, 2006, 15 pages.

Dixon, Colin, et al., "An End to the Middle," Proceedings of the 12th conference on Hot topics in operating systems USENIX Association, May 2009, 5 pages, Berkeley, CA, USA.

Dumitriu, Dan Mihai, et al., U.S. Appl. No. 61/514,990, filed Aug. 4, 2011.

Guichard, J., et al., "Network Service Chaining Problem Statement; draft-quinn-nsc-probiem-statement-00.txt," Jun. 13, 2013, 14 pages, Cisco Systems, Inc.

Ioannidis, Sotiris, et al., "Implementing a Distributed Firewall," CCS'00, Month Unknown, 2000, 10 pages, ACM, Athens, Greece.

Joseph, Dilip Antony, et al., "A Policy-aware Switching Layer for Data Centers," Jun. 24, 2008, 26 pages, Electrical Engineering and Computer Sciences, University of California, Berkeley, CA, USA.

Mayer, Alain, et al., "Offline Firewall Analysis," Int. L. Inf. Secur. (2006) 5(3), Jun. 16, 2005, 20 pages, Springer-Verlag.

Scarfone, Karen, et al., "Guidelines on Firewalls and Firewall Policy," Sep. 2009, 48 pages, NIST, U.S. Department of Commerce.

Sekar, Vyas, at al., "Design and Implementation of a Consolidated Middlebox Architecture," In Proc. of NSDI, Month Unknown, 2012, 14 pages.

Sherry, Justine, et al., "Making Middleboxes Someone Else's Problem: Network Processing as a Cloud Service," In Proc. of SIGCOMM, Aug. 13-17, 2012, 12 pages, Helsinki, Finland.

Stojanovski, Nenad, et al., "Architecture of a Identity Based Firewall System," Jul. 2011, 9 pages.

Stojanovski, Nenad, et al.., "Analysis of Identity Based Firewall Systems," Jun. 2010, 9 pages.

Thames, J. Lane, et al., "A Distributed Firewall and Active Response Architecture Providing Preemptive Protection," ACM-SE'08, Mar. 28-29, 2008, 6 pages, Auburn, AL, USA.

* cited by examiner

GLOBAL OBJECTS FOR FEDERATED FIREWALL RULE MANAGEMENT

CLAIM OF BENEFIT TO PRIOR APPLICATIONS

This application claims the benefit of U.S. Provisional Patent Application 62/187,123, filed Jun. 30, 2015. U.S. Provisional Patent Application 62/187,123 is incorporated herein by reference.

BACKGROUND

Cloud service providers have multiple datacenters in the same or multiple geographical locations. A tenant's workload might span across these datacenters in multiple locations managed by multiple compute and network management entities. In addition, it is desirable to transition applications from one zone to another. For instance, customers like to move applications from staging to production, where staging servers and the production servers are located in different datacenters and are managed by different compute and network management entities.

It is desirable to provide enhanced security solutions via a distributed firewall where rules can be propagated to and enforced across all the datacenters. The current solutions can only make use of static definition of grouping constructs (or containers) or security groups that include Internet protocol (IP) addresses and media access control (MAC) addresses.

A translation service translates the objects consumed in services such as distributed firewall into a set of IP addresses and MAC addresses based on the firewall rule field it is used. The translation process resolves the objects used in the firewall rules locally based on the objects stored in the datacenter's local object inventory and not based on objects across multiple datacenter environments. This approach only allows enforcing firewall rules that are based on static addresses across multiple datacenters.

Other firewall management solutions provide firewall protection in a single datacenter. Different datacenter sites typically have different management solutions for site-local firewall management. As such, there are no solutions available for centralized management of firewall across datacenters where one site can request or set firewall policies on another sites.

BRIEF SUMMARY

In some embodiments, the virtual machines (VMs) of a tenant are spread across multiple datacenters that are managed by different compute manager servers and network manager servers. The firewall rules typically include several tuples and an action. The tuples refer to different objects that may or may not be recognizable by each network manager server. Each network manager server recognizes the objects that are locally managed.

Some embodiments provide a method for creating global objects and translating firewall rules. The method, for each VM in the datacenter, creates a lightweight VM object that includes a subset of the VM's properties stored in the local object data store. The method stores each lightweight VM object in a global object data store in a distributed cache that is accessible by the network managers of participating datacenters.

The lightweight VM objects in the distributed cache are used to translate distributed firewall rules that include dynamically defined objects. Dynamically defined objects use object identifiers instead of static objects such as IP addresses or MAC addresses. When the identifier of an object in a firewall rule is found in the local object data store of the datacenter, the object identifier is translated to a corresponding globally recognized static address specified in the local object data store. For instance, a VM identifier is translated into a corresponding IP address or MAC address.

When the object is not found in the local object data store, the method searches for the object in the global data store. If the object is found, the object identifier is translated to a corresponding globally recognized static address specified in the global object data store. For instance, a VM identifier is translated into a corresponding IP address or MAC address. The method then distributes the translated firewall rules to the firewall enforcement points.

Some embodiments provide a method for defining universal security tags and using the tags to define distributed firewall rules that can be enforced across multiple datacenters. The method receives the definition of one or more universal security tag on a master network manager. For instance, the method receives definitions of one or more security tags from an administrator console coupled to the master network manager.

The master network manager then replicates the universal security tags to the slave network managers. One or more VMs are then associated to each security tag. For instance, a user associates workload VMs to each security tag using the master or slave network managers. The method then receives definition of one or more universal security groups and includes one or more security tags to each universal security group. The method then receives definition of firewall rules based on the universal security groups. For instance, the method receives definitions of the firewall rules from an administrator console coupled to the master network manager.

The method then receives definition of one or more universal firewall sections and adds the firewall rules to the universal firewall sections. The master network manager then replicates then universal firewall sections to the slave network managers. Each network manager then provisions the firewall rules on all hosts and enforces security for the VMs on the hosts in the corresponding datacenter.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
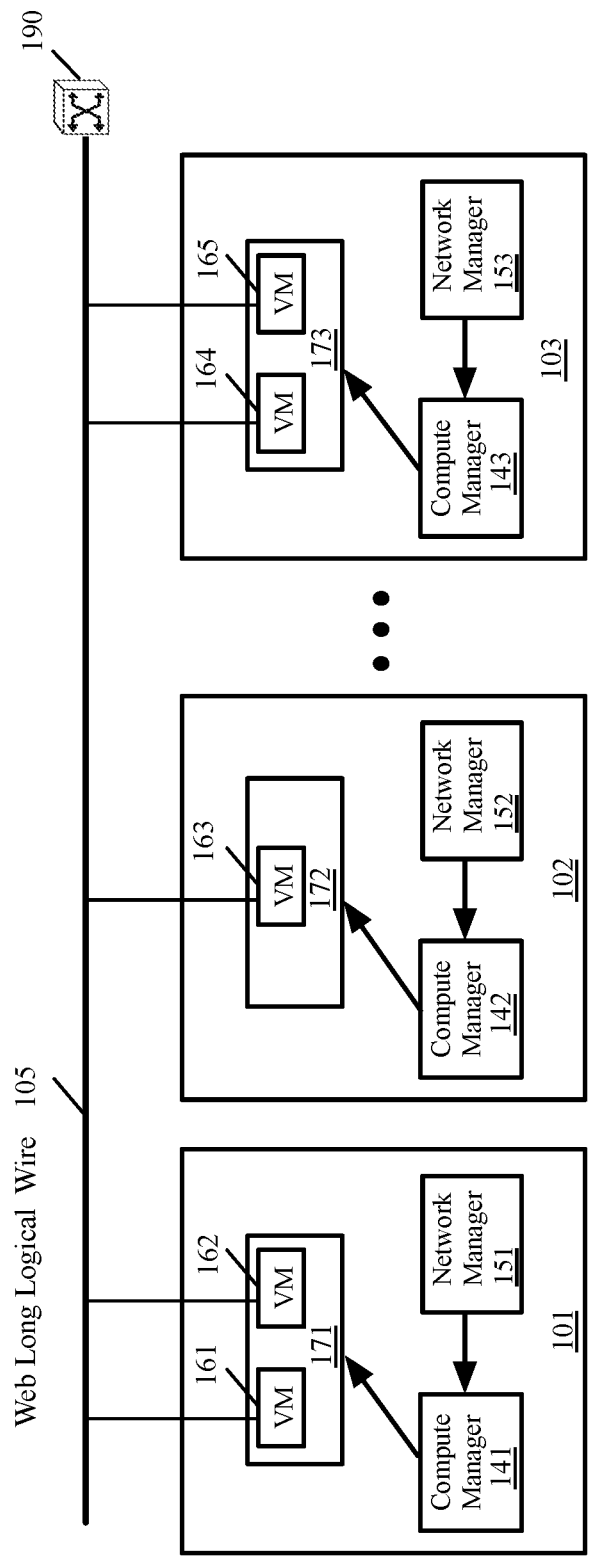
FIG. 1 conceptually illustrates several datacenters with different compute and network managers.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for creating global objects and translating firewall rules using the global objects. These embodiments, for each VM in the datacenter, create a lightweight VM object that includes a subset of the VM's properties stored in the local object data store. The lightweight VM objects are stored in a global object data store in a distributed cache that is accessible to network managers of all participating datacenters.

The lightweight VM objects in the distributed cache are used to translate distributed firewall rules that include dynamically defined objects. Dynamically defined objects use object identifiers instead of static objects such as IP addresses or MAC addresses. For instance, any identifier that uniquely identifies an object across the multiple datacenters can be used as the dynamically defined identifier of the object.

I. Dynamically Defined Global Objects that are Recognizable Across Multiple Datacenters Some embodiments provide global objects for consumption in distributed firewall rules. A traditional firewall implements a set of security rules to enforce access control between two networks to protect the resources located inside one of the networks (e.g., an enterprise's private network) from the other network (e.g., the Internet). The traditional firewalls rely on topology restrictions and enforcement of firewall rules at the network entry points.

In distributed firewalls, the security policy is defined centrally but the firewall rules are enforces at the individual endpoints such as the hosts and forwarding elements inside a network. When a tenant's workload spans across these datacenters, it is desirable to provide enhanced security solutions via a distributed firewall where the security rules can be propagated to and enforced across all datacenters. Accordingly, objects used in firewall rules have to be translated into addresses that are recognized at different enforcement points across multiple datacenters.

A. Issues with Translation of Objects Consumed in Services Across Multiple Datacenters A translation process translates objects that are consumed in network services, such as a distributed firewall, into a set of IP addresses, MAC addresses, and virtual network interface card (VNIC) universally unique identifiers (UUIDs). A translation process that resolves the objects in firewall rules based on the local object inventory in a datacenter faces limitations translating firewall rules when the workload spans across multiple datacenters that are managed by different compute and network manager servers. For instance, a network manager server can only translate grouping constructs based on the entities that are imported from the compute manager to which the network manager is connected. In other words, the network manager only recognizes the entities that are managed locally by the network manager and the compute manager.

As a result, when a tenant defines a security group to match all VMs satisfying a certain condition (e.g., belonging to the finance department with VMs spanning across multiple datacenters), the security group will only contain the IP addresses that are locally resolvable. The tenant has to use static groups like IPSets and MACSets in rules defined in the global firewall section. An IPSet in some embodiments includes a set of IP addresses. A MACSet in some embodiments includes a set of MAC addresses.

The following example illustrates the shortcoming of a translation process that resolves the objects in firewall rules based on the local object inventory. A typical translation service translates the objects consumed in firewall rules into a set of IP addresses, MAC addresses, and VNIC UUIDs based on whether the object is used in source, destination or AppliedTo field in the firewall rule. The translation process resolves the objects used in firewall rules locally based on the objects present in the local inventory and not based on objects across multiple network managers in a multi datacenter environment. The same applies with the security groups (with static definitions) and virtual center objects.

FIG. 1 conceptually illustrates several datacenters with different compute and network managers. A datacenter is a facility that houses computing resources, networking resources, storage resources, and the associated components for one or more tenants (or customers). The figures shows several datacenters (referred below as DC1-DC3) 101-103. Each datacenter 101-103 includes a compute manager 141-143, respectively. The compute manager is a virtualized server that is installed on one or more physical servers. The compute manager is used to manage compute infrastructure of a datacenter.

Each datacenter 101-103 also includes a network manager 151-153, respectively. The network manager is a virtualized server that is installed on one or more physical servers and is used to define and/or manage the networking resources of a datacenter.

Datacenters 101-103 also include one or more hosts 171-0173. For simplicity, only one host 171-173 is shown on each datacenter 101-103. The hosts in some embodiments are physical servers that include virtualization software (or hypervisor). VMs and guest operating systems are installed on the hosts. Each host hosts one or more VMs 161-165.

In some embodiments, a virtual machine is an emulation of a particular computer system. In some embodiments, the virtualization software includes a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are a logical representation of a forwarding element that is presented to a user when designing a logical network. In some embodiments, several PFEs are distributed throughout the network implement tenant's LFEs, where each PFE is a local instantiation of an LFE that operate across different host machines and can perform Open Systems Interconnection (OSI) model Layer 2 (L2)/Layer 3 (L3) packet forwarding between VMs on the host machine or on different host machines. An LFE is sometimes referred to as a virtual distributed switch (VDS). In some embodiments, an LFE spans across multiple datacenters. The routing is provided by global virtual distributed router (VDR) 190. A VDR provides a one-hop routing that enables a packet to be sent between two LFEs without going through a gateway Network connections can be provided by different methods. For instance, a stretched L2 network that uses physical routers can be utilized to connect VMs on different hosts. Global (long) logical wires can be defined to stretch an overlay network across multiple datacenters. The global logical wires can be defined, e.g., by using forwarding elements. Other techniques such as defining virtual local area networks (VLANs) can be utilized to provide network connectivity.

As shown, a global logical wire "webwire" 105 stretches to datacenter 101 (DC-1), datacenter 102 (DC-2), and datacenter 103 (DC-3). DC-1 101 is managed by compute manager 1 141 and network manager 1 151 {CM-1, NM-1}, DC-2 102 is managed by compute manager 2 142 and network manager 2 152 {CM-2, NM-2}, and DC-3 103 is managed by compute manager 3 143 and network manager 3 153 {CM-3, NM-3}.

The VMs connected to the global webwire 105 in DC-1 101 are VMs 161-162 {web-vm-1, web-vm-2}. The VM connected to the global webwire 105 in DC-2 102 is VM 163 {web-vm-3}. The VMs connected to the global webwire 105 in DC-3 103 are VMs 164-165 {web-vm4, web-vm-5}.

Now consider the rule defined as webwire→webwire any drop. The intention is that each host should have following rule on the data path:

{web-vm-1, web-vm-2, web-vm-3, web-vm4, web-vm-5}→{web-vm-1, web-vm-2, web-vm-3, web-vm4, web-vm-5} any drop The rule, however, will be realized as following across multiple datacenters. For DC-1 {CM-1, NM-1}, the rule will be:

{web-vm-1, web-vm-2}→{web-vm-1, web-vm-2} any drop

For DC-2 {CM-2, NM-2}, the rule will be:
{web-vm-3}→{web-vm3} any drop
For DC-3 {CM-3, NM-3}, the rule will be:
{web-vm-4, web-vm-5}→{web-vm-4, web-vm-5} any drop This means web-vms within the same datacenter cannot talk to each other while they can talk across datacenters, though the intention was that no web-vm on this global logical switch should be able to talk to each other. This also holds true for a security group with dynamic criteria such as {web-vm*}, tags, etc.

In order to overcome the above-mentioned shortcomings, the prior art systems use statically defined objects such as IPSets, MacSets, IP addresses, or MAC addresses in the distributed firewall rules. However, firewall rules that are written based on objects such as IPSets, MacSets, IP addresses, or MAC addresses are hard to read and maintain. The user has to manually add and update IP and MAC addresses used in the statically defined sets/grouping constructs/objects.

B. Dynamically Defined Global Objects that are Recognizable Across Multiple Datacenters To prevent forcing a tenant to use static IP addresses or MAC addresses for firewall rules, some embodiments provide a method that allows a user to define dynamic objects and define security policies based on these objects. The membership changes in these dynamic objects are automatically handled and the objects are automatically translated to objects such as IP addresses and MAC addresses by the underlying system.

Some embodiments provide a distributed cache across multiple datacenters. The distributed cache is used as a global object data store FIG. 2 conceptually illustrates a group of datacenters that support dynamically defined global objects in some embodiments. The figure shows several datacenters 201-203. Each datacenter 201-203 has a network manager server 211-213, a local object data store 251-253, and a message broker 261-263, respectively. Each network manager 211-213 includes a distributed firewall (DFW) publisher 221-223, a global translation provider 231-233, and a local translation provider 241-243, respectively. One of the network managers 211 is designated as the master (or primary) network manager and the other participating network managers 212-213 are designated as slave (or secondary) network managers.

As shown, datacenters 201-203 share a distributed cache 270 that acts as (or is used to store) a global object data store. The distributed cache is accessible to the network managers in each datacenter. The cache used in some embodiments is volatile memory (as opposed to non-volatile storage such as disk).

In some embodiments, the global object data store in distributed cache 270 operates as a key-value data store (or database). Objects or records are stored and retrieved by using a key that uniquely identifies the record. Each record can have one or more fields that contain data.

In some embodiments, the distributed cache is implemented as a cluster where each network manager server operates as a node of the distributed cache cluster. When a new network manager server is added, a distributed cache node is instantiated on the new network manager server and the node is added to the cluster. Once a node is added to the cluster, all the objects stored in the distributed cache cluster are replicated on the new node.

Some embodiments define lightweight VM objects that persists in the distributed cache. These lightweight VM objects 281-286 are derived from their counterpart VM information stored in the local object data stores 251-253. These lightweight VM objects include the bare minimum properties of each VM that are required for the translation process (i.e., the information required to translate a dynamically defined identifier of VM to a corresponding statically defined identifier such as an IP address or MAC address).

Figure 2:
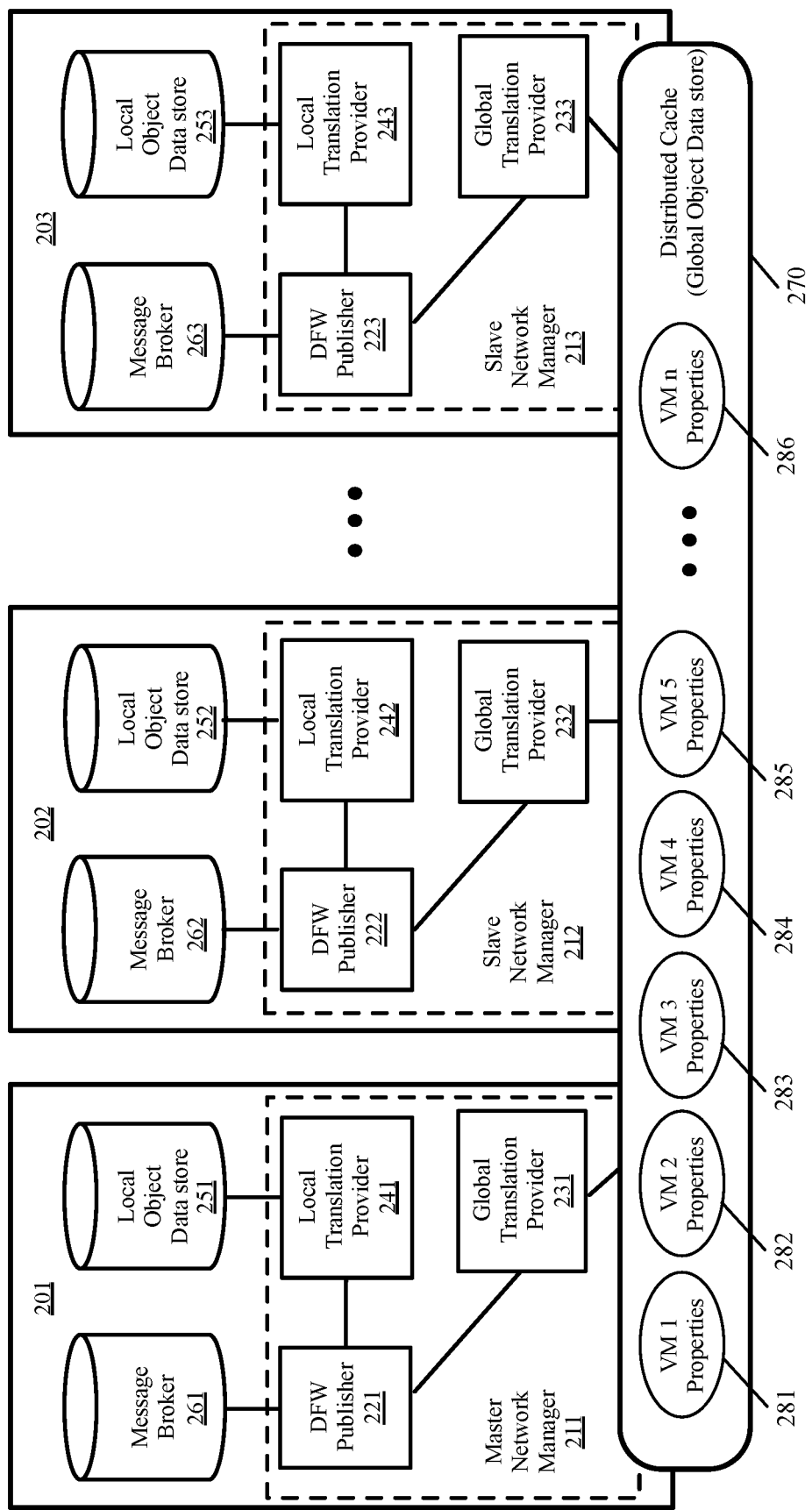
FIG. 2 conceptually illustrates a group of datacenters that support dynamically defined global objects in some embodiments.

Although the example of FIG. 2 shows properties of VMs stored in the distributed cache, it should be understood that properties of any other objects used in distributed services across multiple datacenters such as objects used in distributed firewall rules can be stored in the distributed cache.

Each distributed firewall publisher 221-223 receives a set of firewall rules (e.g., firewall rules that are defined using an administrator console (not shown) connected to the master network manager 211 and distributed by the master network manager to the slave network managers 212-213). Typically, firewall rule definitions include the following five tuples: source, source port, destination, destination port, and service (or application), in addition to an action value.

In some embodiments, the firewall rules include an additional tuple (referred to herein as the AppliedTo tuple). The AppliedTo tuple lists a set of enforcement points (network nodes) at which the firewall rule has to be applied. In some embodiments, the enforcement points can be defined in terms of (1) VNICs, VMs, hosts, or other compute constructs (e.g., compute clusters, datacenters, etc.), (2) network elements, such as PFEs, LFEs, other managed appliances, unmanaged third-party appliances (e.g., third party firewalls), and/or combination of such elements, and/or (3) security groups that are formed by a set of one or more VNICs, VMs, hosts, compute constructs and/or network constructs.

For instance, an AppliedTo firewall rule can be limited (by the AppliedTo tuple) to a security group that is specified in terms of (e.g., by using the identifier of) a particular compute cluster and a particular logical network that connects a particular tenant's VMs that execute on the cluster's hosts. Security groups can be specified by users (e.g., network administrators) in some embodiments. Conjunctively, or alternatively, security groups can be specified by automated process in some embodiments. Each grouping construct has an identifier. The grouping constructs identifiers are, for example, used in the AppliedTo tuple of firewall rules.

The local translation provider component 241-243 of each network manager 211-213 resolves local objects by searching the corresponding local objects data store to resolve the rules. For instance, local translation provider 241 receives firewall rules from distributed firewall publisher 221 and searches local object data store 251 to resolve the objects in the rules to a globally recognized static object such as an IP address or a MAC address. The local object data store 251 in some embodiments provides the mapping of the locally defined objects to the corresponding globally recognized IP address, MAC address, etc. If the object is not in the local object data store 251, the distributed firewall publisher 221 uses the global translation provider 231 to search the global object data store maintained in the distributed cache 270 to resolve the rules.

Figure 3:
FIG. 3 conceptually illustrates an example of information stored in a global data store in some embodiments.

FIG. 3 conceptually illustrates an example of information stored in a global data store in some embodiments. The figure shows an example of a class diagram for a lightweight VM object 305 that is stored in the distributed caches. The global object data store in the distributed caches 270 of FIG. 2 is independently populated by each network manager 211-213 from the VM objects stored in the corresponding local object data store 251-253.

The lifecycle (i.e., add, update, delete) of the lightweight objects 305 (e.g., lightweight objects 281-286 in the global object data store 270 in FIG. 2) is handled based on the life cycle of the corresponding objects in the local object data stores 251-253. For instance, if a VM object is deleted from a local object data store, the corresponding lightweight VM object in the global object data store is also deleted. As another example, when a VM is moved from a source datacenter to a target datacenter, the VM information in the local object data store and the lightweight VM information in the global object data store is first deleted by the network manager of the source datacenter. Once the VM is moved to the target datacenter, the VM information is added to the local object data store and the corresponding lightweight VM object is added to the global object data store by the network manager of the target datacenter.

In the example of FIG. 3, the lightweight VM object stored in the distributed cache is the CachedVirtualMachine object 305. The object includes the UUID 321 of the VM instance, the lightweight information of the corresponding VNIC 322, and a flag 323 that indicate whether the VM is powered on. The VNIC information 322 in this example is stored as a separate class, CachedVnic 310. The key to CachedVirtualMachine 305 class is the VM instance UUID 321, which is unique and is preserved when a VM is moved from one datacenter to another datacenter.

In this example, CachedVnic 310 class includes the UUID 331 of the VNIC, the MAC address 332 of the VNIC, the IP address 333 of the VNIC, the port group identification 334 of the VNIC, a flag 335 to indicate whether the spoof guard is enabled for the VNIC, and the published IP address 336 of the VNIC (i.e., the IP address used for the spoof guard).

CachedVirtualMachine 305 class (in which CachedVnic 310 class is embedded) is stored in the global object data store. The class CachedManagedEntity 315 is an abstract entity whose properties are inherited by CachedVirtualMachine 305 and CachedVnic 310 classes. CachedManagedEntity 315 includes the following attributes: identification 341, revision 342, the parent identification 343, the parent managed entity 344, name 345, and a flag 346 to indicate whether the object is a system resource.

C. Translation of Dynamically Defined Global Objects

Referring back to FIG. 2, when the local translation provider 241 cannot find an object used in a firewall rule in the local object data store 251, the distributed firewall publisher 221 uses the global translation provider 231 to search the global object data store maintained in the distributed cache 270 to resolve the rules. The global object data store provides the mapping of the objects to the corresponding globally recognized IP address, MAC address, etc., using objects such as CachedVirtualMachine object 305 in FIG. 3. For instance, the CachedVirtualMachine object 305 (and the CachedVnic object 310 embedded in the CachedVirtualMachine object) maps the VM UUID 321 to an IP address 333 or MAC address 332.

The global translation provider 231 uses the relationships among different objects such as universal security groups, universal security tags, and VMs to derive a list of instance identifiers of the VMs. Further details for universal security groups and universal security tags are provided below.

The global translation provider 231 then translates this list into IP addresses or Mac addresses from objects (e.g., CachedVirtualMachine object 305 in FIG. 3) stored in the global object data store in the distributed cache 270. The Distributed Firewall publisher 221 invokes the respective translation providers 241 and 231 based on the objects consumed in the source, destination, and AppliedTo fields in the rules defined in the universal section. The VNIC list translation for the grouping constructs used in AppliedTo fields does not need to be translated by the global translation provider as the enforcement is always based on the local repository. Similarly, global translation provider 232-233 translate the firewall rules into rules that refer to IP or MAC addresses using the global objects inventory.

Figure 4:
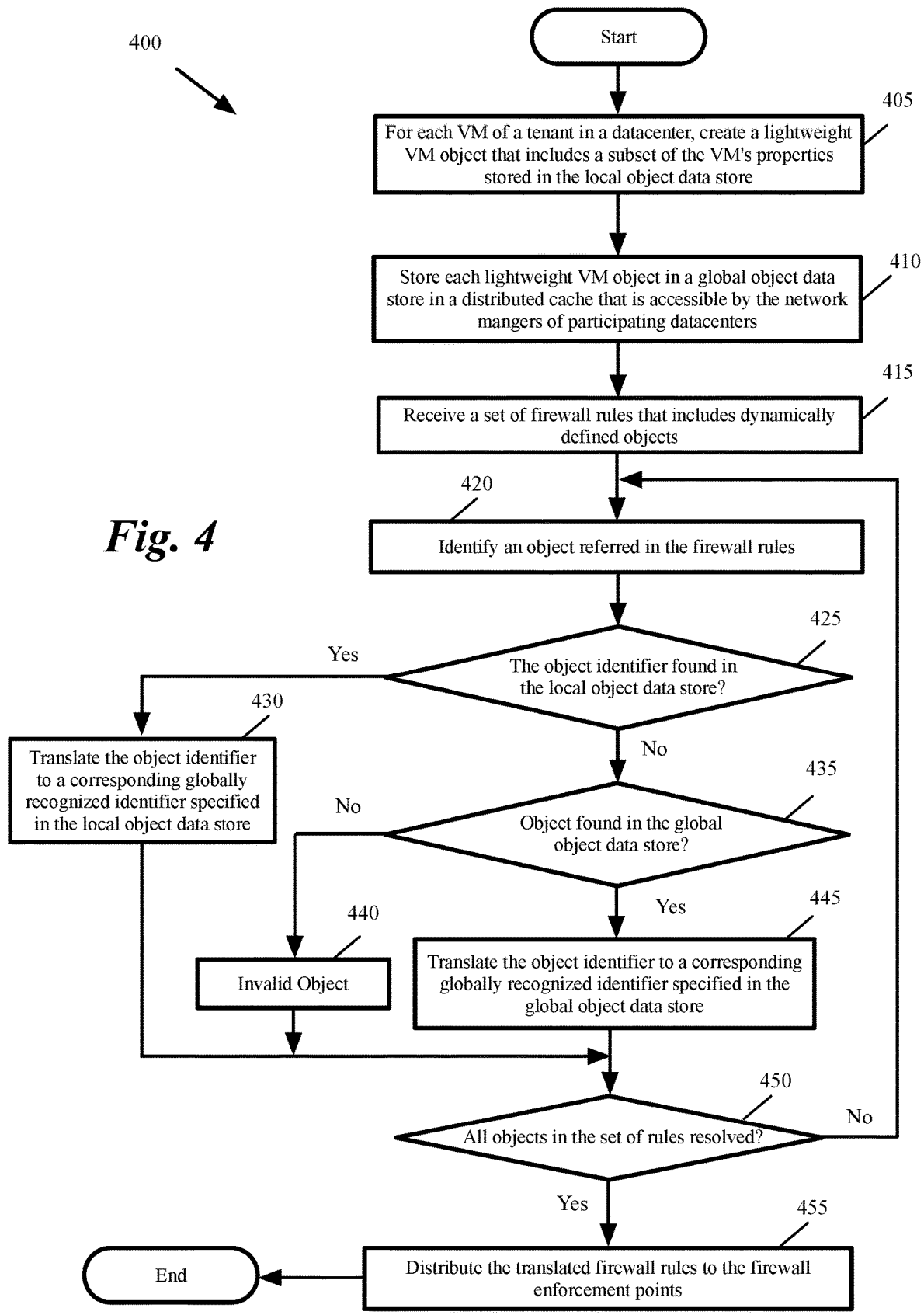
FIG. 4 conceptually illustrates a process for creating global objects and translating firewall rules in some embodiments.

FIG. 4 conceptually illustrates a process 400 for creating global objects and translating firewall rules in some embodiments. In some embodiments, process 400 is performed by the network managers (such as network managers 211-213 in FIG. 2) of each datacenter. The process, for each VM in a datacenter, creates (at 405) a lightweight VM object that includes a subset of the VM's properties stored in the local object data store. For instance, the process creates a VM object such as VM object 305 in FIG. 3 for each of a tenant's VMs.

The process then stores (at 410) each lightweight VM object in a global object data store in a distributed cache that is accessible by the network managers of participating datacenters. For instance, the process stores VM object 281 in global object data store in distributed cache 270 shown in FIG. 2. In some embodiments, each VM object stored in the global object data store maps a persistent identifier of a VM (e.g., the UUID of the VM) to a static object such as an IP address or MAC address.

The process then receives (at 415) a set of firewall rules that include dynamically defined objects. Dynamically defined objects use object identifiers instead of static objects such as IP addresses or MAC addresses.

The process then identifies (at 420) an object in the firewall rules to translate. The process then determines (at 425) whether the object identifier is found in the local object data store of the datacenter. For instance, the local translation provider 242 searches local object data store 252 of datacenter 202 to determine whether the object exists in the local object data store 252.

If not, the process proceeds to 435, which is described below. Otherwise, the process translates (at 430) the object identifier to a corresponding globally recognized identifier specified in the local object data store. For instance, the process translates a VM identifier into a corresponding IP address or MAC address. The process then proceeds to 450, which is described below.

When the object is not found in the local object data store, the process determines (at 435) whether the object is found in the global data store. For instance, the process searches objects such as "CachedVirtualMachine" object 305 in FIG. 3 that are stored in the distributed cache 270 of FIG. 2. If the object is not found, the process marks (at 440) the object as invalid and proceeds to 450, which is described below.

Otherwise, the process translates (at 445) the object identifier to a corresponding globally recognized identifier specified in the global object data store. For instance, the process uses the mapping of a VM UUID to an IP address or MAC address provided by a CachedVirtualMachine object 305 and the corresponding embedded CachedVnic object 310.

The process then determines (at 450) whether all objects in the received set of rules are resolved. If not, the process proceeds to 420, which was described above. Otherwise, the process distributes (at 455) the translated firewall rules to the firewall enforcement points. The process then exits.

II. Universal Security Tags

Some embodiments define universal security tags that are used to define firewall rules. Security tags are user-defined objects to which one or more VM objects can be associated. The security tags give more flexibility to the end user in deployments where the VMs do not follow a naming pattern or the name may be changed. The security tags are exposed to the tenant (the end user) and the tenant can freely attach and detach VMs to security tags. The tenant can also handle the lifecycle and membership management of the security tags.

The security tags are used to classify workloads in the datacenters. One aspect of such classification is compliance. For instance, all workloads that need to follow certain kind of compliance can be associated with a particular compliance tag. Users can then create security policies using security groups that are based on these tags to enforce compliance for these workloads. Security groups are grouping constructs that group datacenter elements such as security tags, IPSets, and MACSets.

Some embodiments provide universal security tags that are replicated across multiple network managers in different datacenters. When new objects are created in a datacenter (e.g. adding a host or creating a VM), an identifier that is unique in the datacenter (but not necessarily unique across multiple datacenters) is assigned to the new object. This locally unique identifier is used by different services in the datacenter to reference the objects created within the datacenter (i.e., the local objects).

Local security tags can be defined to associate with a list of the VMs. The relationship among the local security tags and the VMs are mapped using the VMs' identifier that is unique in the datacenter. This approach, however, has certain limitations and does work well in cases where a VM re-registers itself, e.g., in case of storage motion within the datacenter. Storage motion occurs when a VM's disk files are relocated from one shared storage location to another shared storage location.

As the identifier that is unique in the datacenter changes in this process, the security tag to VM association is lost and the user has to associate the VM to the security tag again using a newly assigned identifier. To overcome this shortcoming, some embodiments utilize a different VM identifier for associating the VM with a universal security tag. In these embodiments, the VM to universal tag association is based on the VM UUID or instance ID, which does change during the storage motion or during motion of a VM from one datacenter to another datacenter. Changes in VM to tag associations are replicated by the master network manager to slave network managers.

Figure 5:
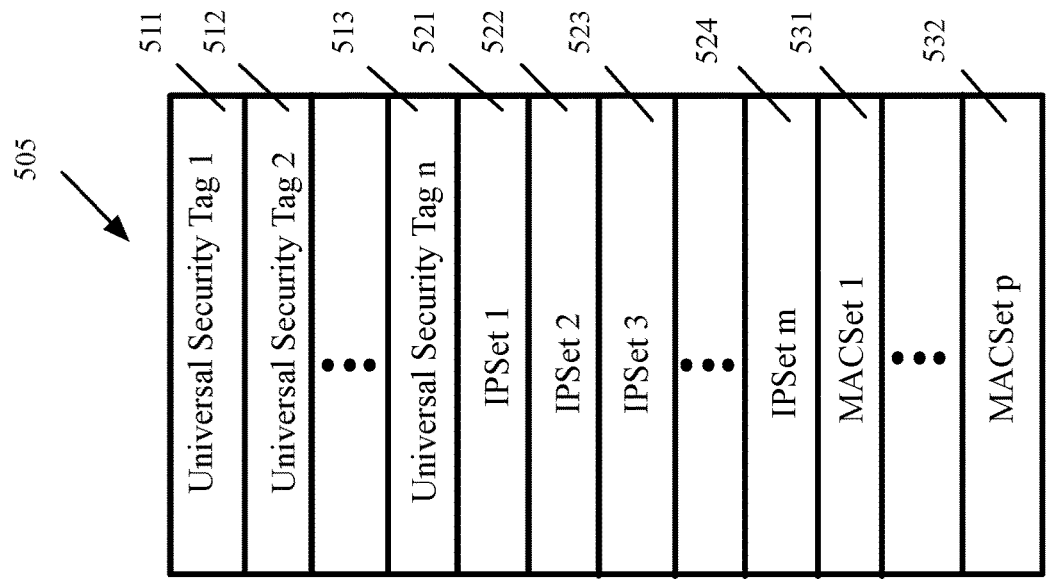
FIG. 5 conceptually illustrates a universal security group defined in some embodiments.

Universal security groups in some embodiments support universal security tags as members. In addition, universal security groups support IPSets and MACSets as members. FIG. 5 conceptually illustrates a universal security group defined in some embodiments. As shown, the universal security group 505 includes one or more universal security tags 511-513. The universal security group 505 also includes several IPSets 521-524 and several MACSets 531-532.

In some embodiments, firewall rules are placed in universal (global) sections, which are entities that are replicated across the datacenters. The universal firewall sections allow multiple network managers to share, replicate and remain in sync for distributed firewall rules or part of the rule configuration. The universal firewall sections contain the rules that are to be replicated across multiple network managers. Some embodiments place firewall rules in a grouping construct that can include any type of network, compute, or security constructs. In some embodiments, one or more of the compute constructs, network constructs, and security constructs can be specified as dynamic grouping constructs that can have members (e.g., forwarding elements, VMs, hosts, VNICs, etc.) dynamically added and/or removed from them. In order to provide support for a multi datacenter work environment, some embodiments provide a set of universal (or global) grouping constructs as well as local grouping constructs. In some embodiments, a member is added to a grouping construct by adding an identifier of the member in the grouping construct.

The members of the universal grouping constructs are defined such that each member's identification is unique across all datacenters that are participating in the multi datacenter solution. On the other hand, the members in a local grouping construct only need to be uniquely identified in the datacenter where the members are located. For instance, two VMs with the same identifier can exist in local grouping constructs in two different datacenters. In contrast, every VM in a universal grouping construct has to be uniquely identifiable across all participating datacenters.

Figure 6:
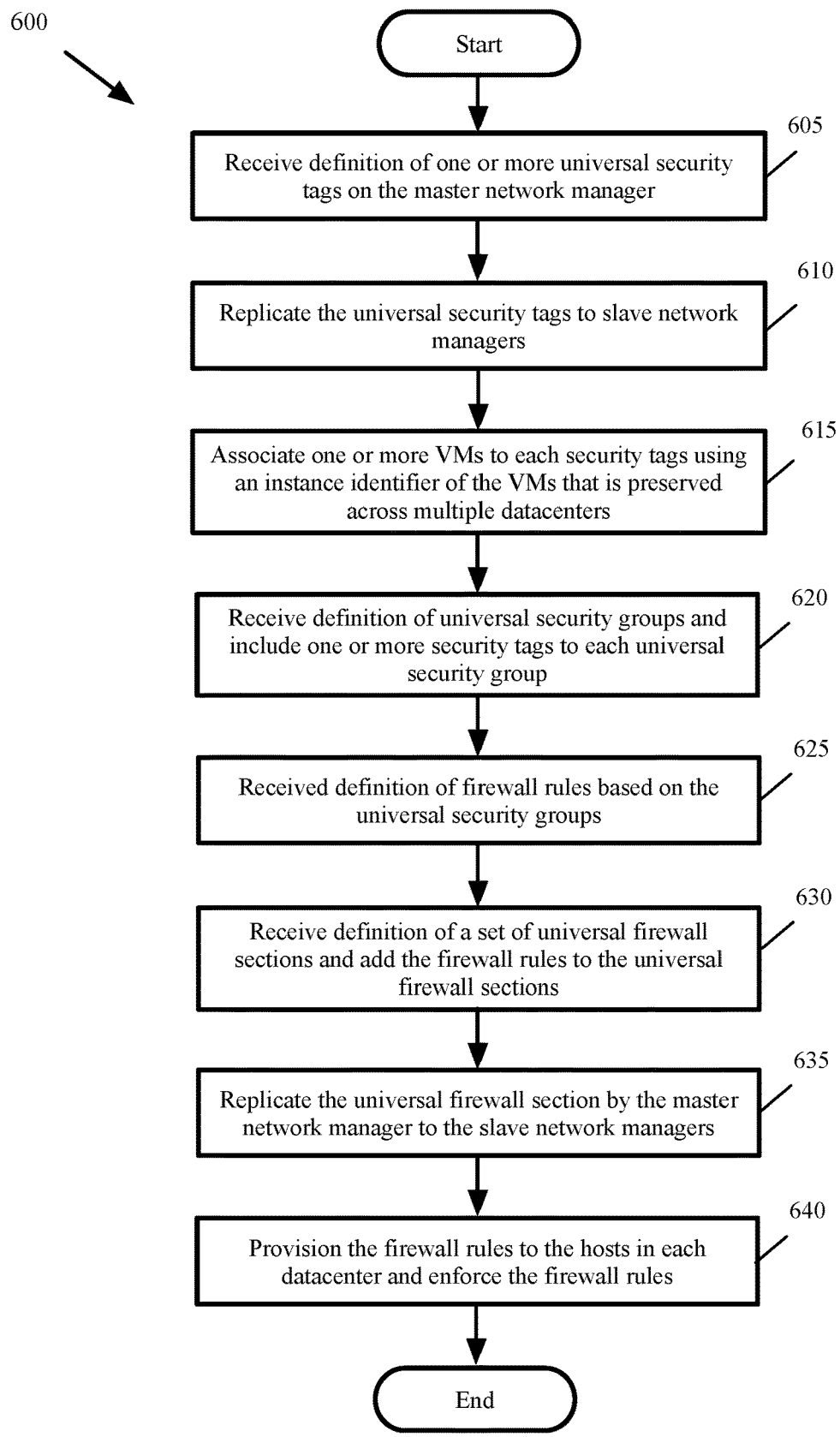
FIG. 6 conceptually illustrates a process for defining universal security tags in some embodiments.

FIG. 6 conceptually illustrates a process 600 for defining universal security tags in some embodiments. The process in some embodiments is performed by a network manager server in a datacenter such as the master network manager 211 in FIG. 2. As shown, the process receives (at 605) definition of one or more universal security tags on the master network manager. For instance, the process receives definitions of one or more security tags from an administrator console coupled to the master network manager. As an example, a user defines three universal security tags each representing a different tier of a typical three-tiered presentation (or web), application (or app), and database (or db) of an enterprise architecture.

The process replicates (at 610) the universal security tags from the primary network manager to slave network managers. For instance, master network manager 211 replicates the security tags to the slave network manager 212-213 in FIG. 2.

The process associates (at 615) one or more VMs to each security tag. For instance, the process associates a set of workload VMs of a tenant in each datacenter to each security tag using master or slave network managers.

The process then receives (at 620) definition of one or more universal security groups and includes one or more security tags to each universal security group. For instance, the process receives definitions of one or more universal security group and the identification of the associated universal security tags from an administrator console coupled to the master network manager. The process then receives (at 625) definition of firewall rules based on the universal security groups. For instance, the process receives definitions of the firewall rules from an administrator console coupled to the master network manager.

Figure 7:
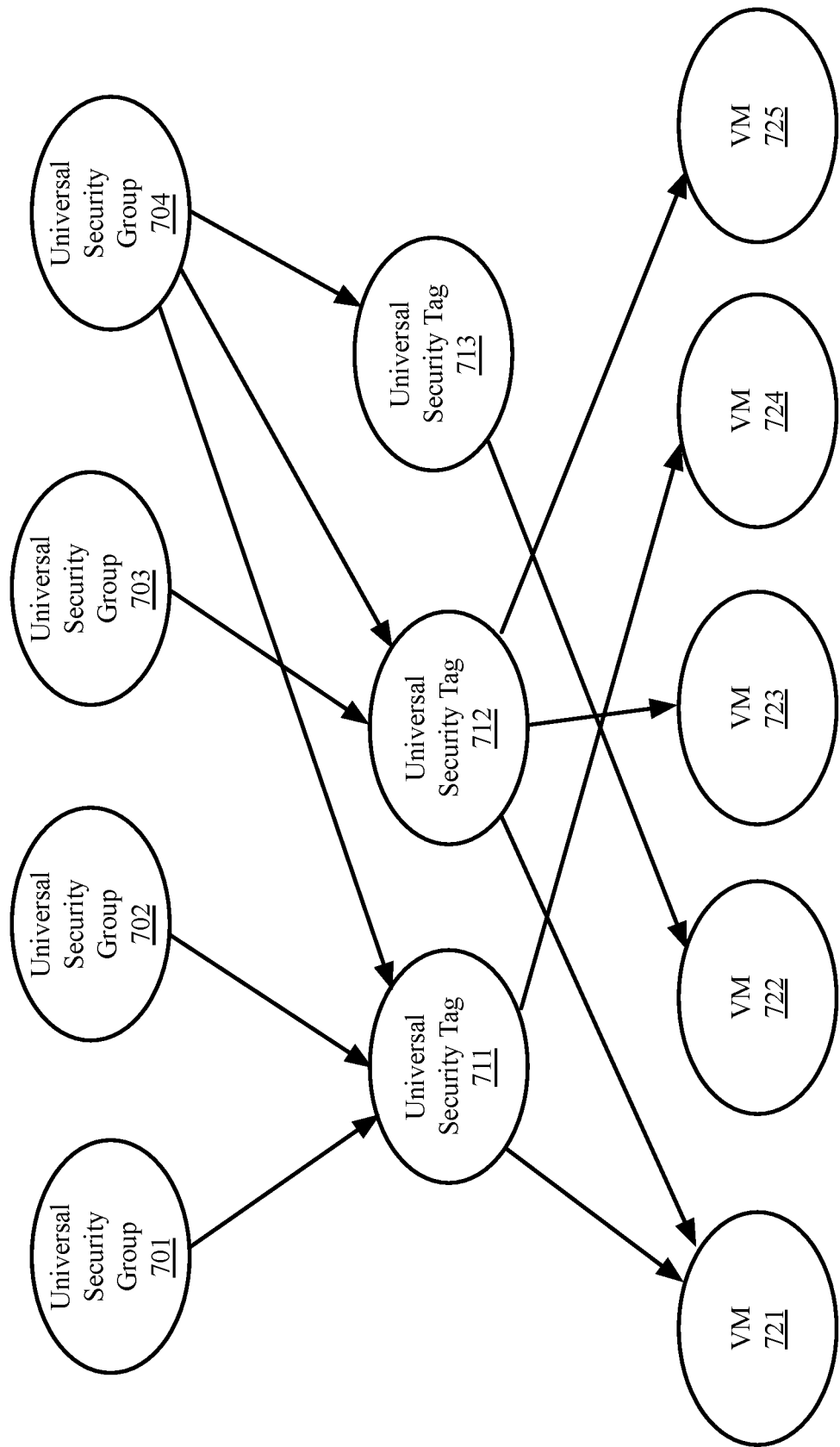
FIG. 7 conceptually illustrates the relationships among universal security groups, universal security tags, and VMs in some embodiments.

FIG. 7 conceptually illustrates the relationships among universal security groups, universal security tags, and VMs in some embodiments. The figure shows several universal security groups 701-704, several universal security tags 711-713, and several VM objects 721-725.

Each universal security group 701-704 is a grouping construct (or container) that includes (or associates with) one or more security tags 711-713. Each security tag is also a grouping construct that includes (or associates) with one or more VM objects 721-725. Each VM object 721-725 is a lightweight grouping construct (such as CachedVirtualMachine 305 in FIG. 3) that includes a subset of the properties that are defined for the VM in the local datacenter.

Referring back to FIG. 6, the process then receives (at 630) definition of one or more universal firewall sections and adds the firewall rules to the universal firewall sections. For instance, the process receives definitions of the global section from an administrator console coupled to the master network manager.

The process then replicates (at 635) the universal firewall section by the master network manager to slave network managers. The process then provisions (at 640) the firewall rules on all hosts and enforces security for the VMs on the hosts. For instance, each network manager provisions the replicated firewall rules to the hosts in the corresponding datacenter. The process then ends.

Figure 8:
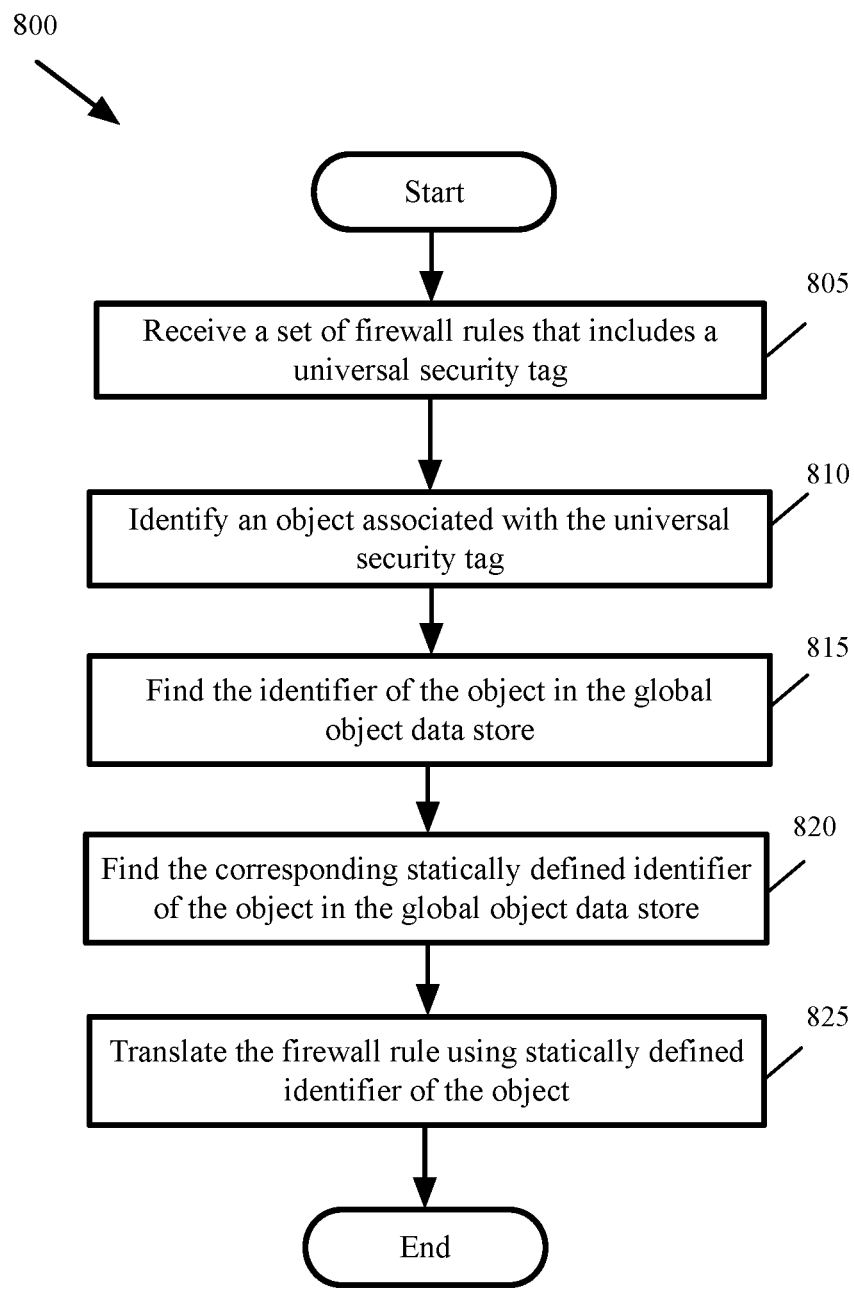
FIG. 8 conceptually illustrates a process for translating firewall rules using universal security tags in some embodiments.

FIG. 8 conceptually illustrates a process 800 for translating firewall rules using universal security tags in some embodiments. The process in some embodiments is performed by a network manger server (e.g., network manager servers 211-213 in FIG. 2) of a datacenter. As shown, the process receives (at 805) a set of firewall rules that include a universal security tag.

The process identifies (at 810) an object associated with the universal security tag. For instance, the process identifies an identifier of a VM (e.g., a VM UUID) that is associated with the universal security tag. The process then finds (at 815) the identifier of the object in the global data store. For instance, the process finds the VM UUID 321 in CachedVirtualMachine object 305 of FIG. 3 that is stored in the global object data store 270 in FIG. 2.

The process then finds (at 820) the corresponding statically defined identifier of the object in the global object data store. For instance, the process maps the VM UUID 321 to VNIC IP address 333 or VNIC MAC address 332 shown in FIG. 3. The process then translates (at 825) the firewall rule using the statically defined identifier of the object. The process then ends.

Figure 9:
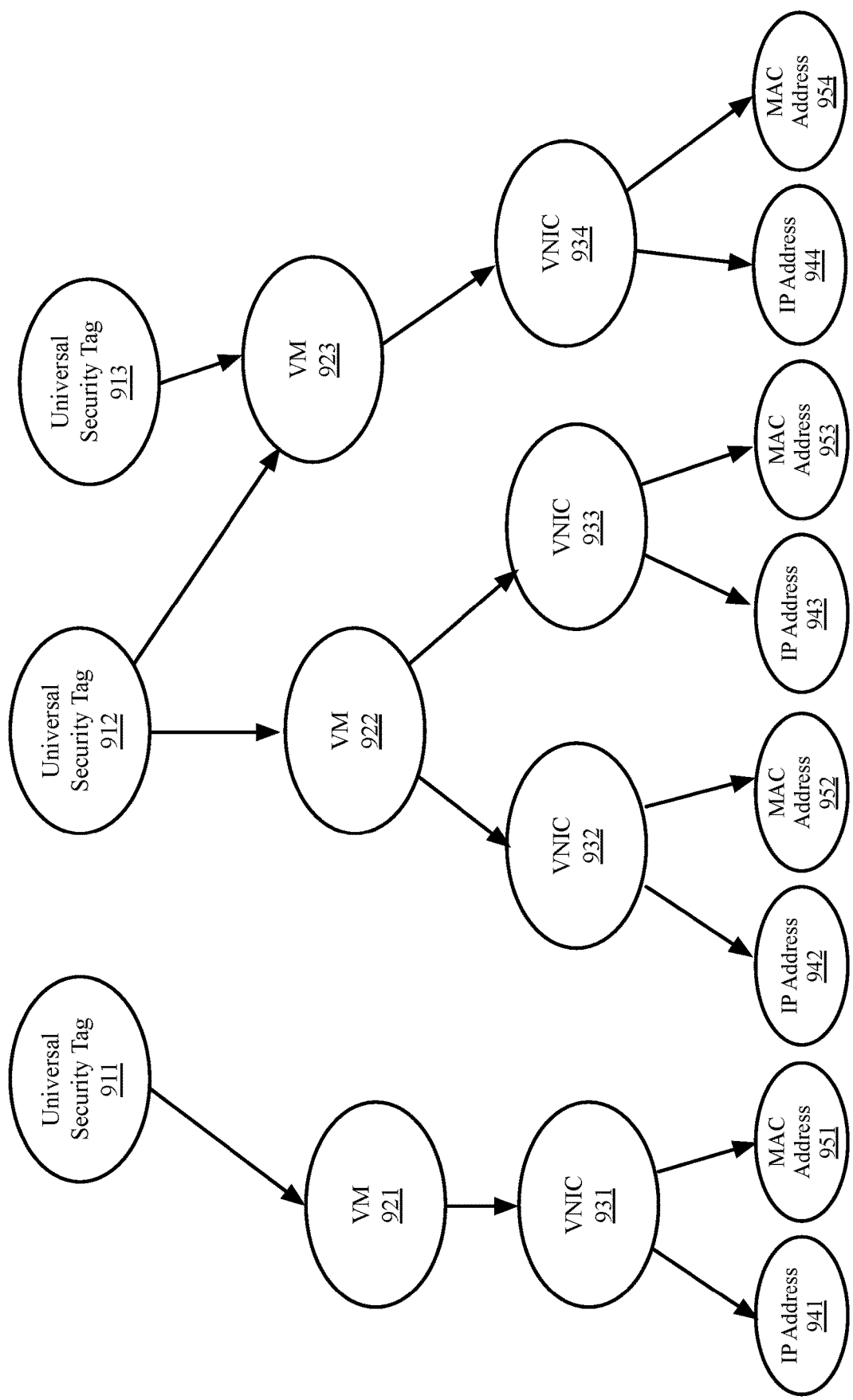
FIG. 9 conceptually illustrates the relationships among universal security tags, VM objects, and VNIC IP and MAC addresses in some embodiments.

FIG. 9 conceptually illustrates the relationships among universal security tags, VM objects, and VNIC IP and MAC addresses in some embodiments. The figure shows several universal security tags 911-913, several VM objects 921-923, several VNIC objects 931-934, several IP addresses 941-944, and several MAC addresses 951-954.

Each universal security tag 911-913 is a construct that includes (or associates with) one or more VM objects 921-923. Each VM object 921-923 is a lightweight construct (such as CachedVirtualMachine 305 in FIG. 3) that includes a subset of the properties that are defined for the VM in the local datacenter.

Each VM object 921-923 is associated with one or more VNIC objects 931-934. Each VNIC object is a grouping construct (such as CachedVnic 310 in FIG. 3) that includes an IP address 941-944 and a MAC address 951-954.

Figure 10:
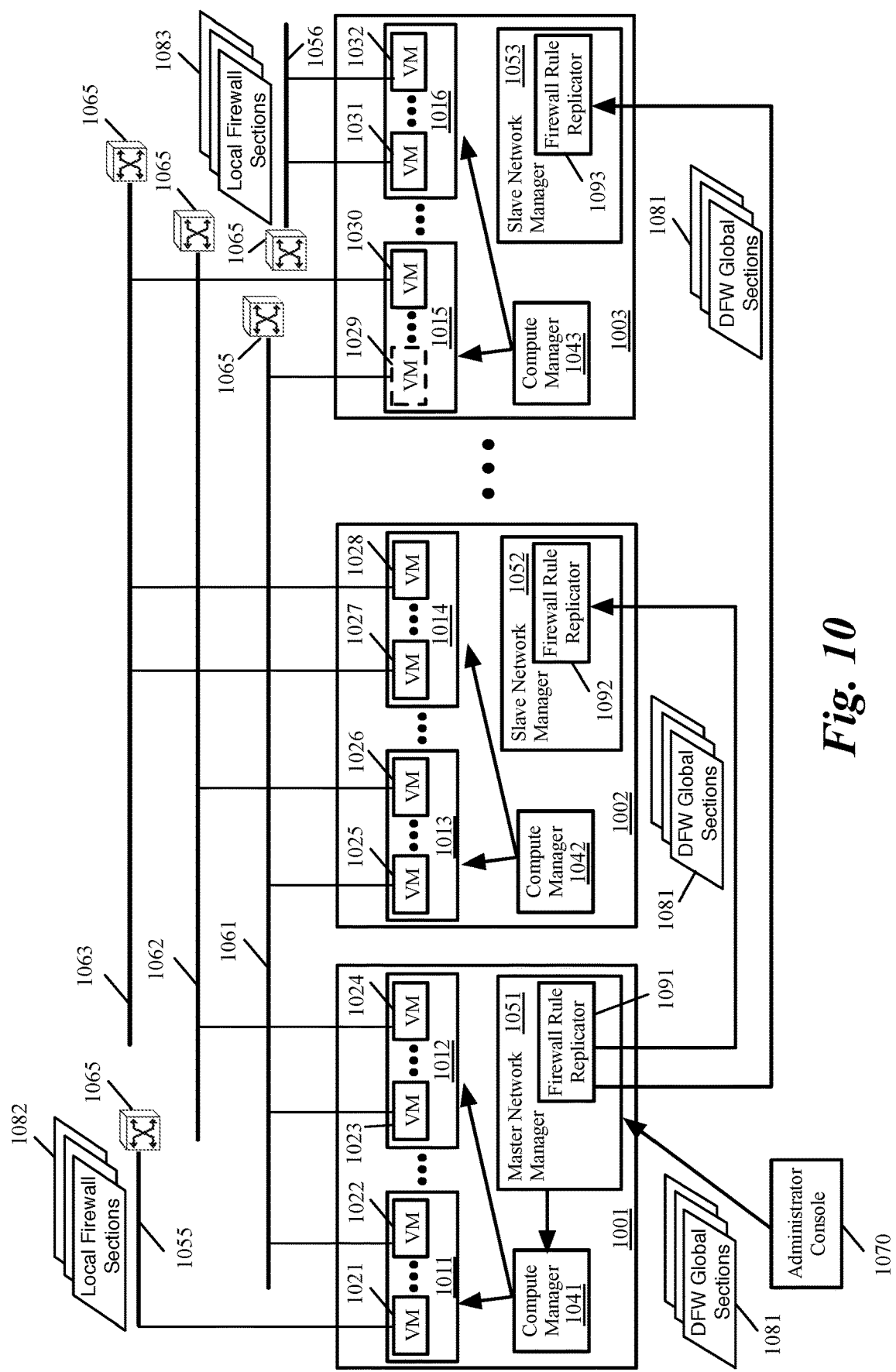
FIG. 10 conceptually illustrates replicating firewall rules in some embodiments.

FIG. 10 conceptually illustrates replicating firewall rules in some embodiments. The figure shows several datacenters 1001-1003. Each datacenter includes a set of hosts 1011-1016. Each host includes virtualization software or hypervisor (not shown) and hosts a set of VMs 1021-1032.

Each datacenter includes a compute manager 1041-1043. Each datacenter also includes a network manager 1051-1053. The hosts are physical servers that include virtualization software (or hypervisor). VMs and guest operating systems are installed on the hosts. The compute managers 1041-1043 operate in a linked mode that allows the servers to share information. Each server can connect to the other server's system and view and/or manage the inventories of the other server.

Different embodiments support different network connections. Some embodiments utilize a stretched L2 network using physical routers. Other embodiments utilize VLANs. Other embodiments define logical wires (or logical switches) that stretch an overlay network across multiple datacenters.

In the embodiment shown in FIG. 10, logical switches are defined as global (or long) logical wires that span across multiple datacenters. As shown, three such global logical wires 1061-1063 are defined to connect different VMs across different datacenters 1001-1003. The routing in this example is provided by a VDR 1065. Several LFEs connect to a VDR. The VDR in some embodiments is implemented by including a local instantiation of the VDR in each virtualization software that connects to the VDR. At the data path, the VDR instance on each virtualization software forwards the traffic from a local VM to a remote VM of another virtual switch directly without going through a gateway. A global VDR in some embodiments spans across several datacenters.

In some embodiments, a system administrator creates and connects VMs across multiple datacenters 1001-1003 using the global logical wires (or global logical switches) 1061-1063. As shown, VMs 1022, 1023, 1025, and 1029 are connected together along the logical line 1061. VMs 1024 and 1026 are connected together along the logical line 1062. VMs 1027, 1028, and 1030 are connected together along the logical line 1063. In addition, the figure shows several VMs 1021, 1031, and 1032, which are not connected to global logical lines. These VMs only require connectivity within a single datacenter and are connected to local logical wires 1055 or 1056. Although the network in FIG. 10 is shown using logical wires, the network in other embodiments utilizes a VLAN with distributed port group or a stretched L2 network using physical routers to provide connectivity between the VMs.

As described above, firewall rules in some embodiments are placed in global sections that are replicated across the datacenters. The global firewall sections allow multiple network managers to share, replicate and remain in sync for distributed firewall rules or part of the rule configuration. The members of the global grouping constructs are defined such that each member's identification is unique across all datacenters that are participating in the multi datacenter solution.

In the example of FIG. 10, the administrator defines a set of universal security tags using an administrator console 1070 connected to the master network manager 1051 and associates one or more VMs to each security tags. The administrator also defines universal security groups. The administrator further defines global firewall rules based on the security groups and places them in a set of global sections 1081 for the distributed firewall. The local firewall rules are defined locally at each datacenter and placed in local firewall sections 1082-1083 sections. Some embodiments utilize other methods for defining firewall rules. For instance, the rules may be defined at locations other than the administrator console and conveyed to the master network manager.

The global sections are replicated across multiple network managers 1051-1053. The global sections in some embodiments are read only on the slave network managers and cannot be edited on slave network manager from an API or user interface (UI).

The rule precedence across the global sections does not interfere with local sections on slave network managers. The overall precedence and ordering of the global sections are maintained. On the slave network manager, the global sections are inserted at the top of the existing sections (e.g., the default section). The administrator in some embodiments is allowed to add sections above and below a global section but that order is overridden in the next update of global sections. The grouping constructs used in the global sections are replicated on the network managers. The object definitions are not edited on the slave network managers.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
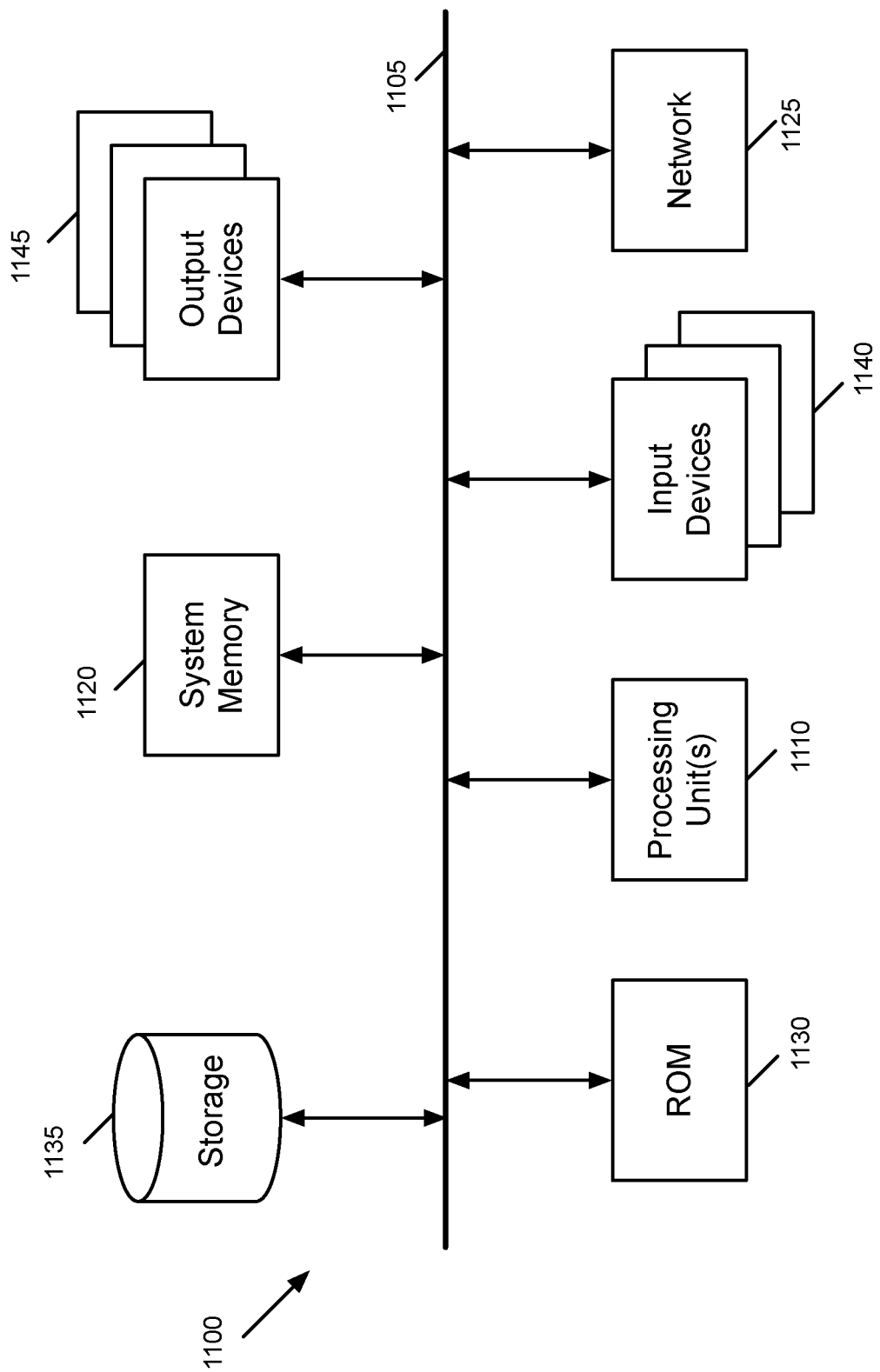
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1120, a read-only memory (ROM) 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1120, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1120 is a read-and-write memory device. However, unlike storage device 1135, the system memory is a volatile read-and-write memory, such as random access memory.

The system memory stores some of the instructions and data that the processor needs at runtime. In some embodiments, the invention's processes are stored in the system memory 1120, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 4, 6, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of defining and distributing firewall rules for a plurality of data compute nodes (DCNs) executing in a set of two or more datacenters, the method comprising:
    at a first datacenter:
        associating a unique identifier, for a DCN in a second datacenter, with a security tag, wherein the unique identifier for the DCN is a globally unique identifier across the first and second datacenters;

defining a firewall rule with a reference to the security tag; and distributing the firewall rule with the reference to the security tag from the first datacenter to a network controller at the second datacenter, wherein the network controller at the second datacenter uses the security tag referenced by the distributed firewall rule to identify the unique identifier for the DCN, maps the unique DCN identifier to a local network address associated with the DCN at the second datacenter, uses the local network address to define a matching attribute of a local firewall rule, and defines an action of the distributed firewall rule as an action of the local firewall rule, wherein a firewall enforcing machine at the second datacenter uses the local firewall rule to process packets associated with the DCN in accordance with a firewall action specified by the local firewall rule.

2. The method of claim 1 further comprising:
associating the security tag with a security group,
wherein the reference to the security tag is a reference to the security group associated with the security tag.

3. The method of claim 1, wherein even after the DCN moves from the second datacenter to a third datacenter in the set of datacenters, the unique identifier does not change for the DCN.

4. The method of claim 1, wherein the unique identifier of the DCN is a universally unique identifier (UUID) of the DCN.

5. The method of claim 1, wherein the network address associated with the DCN comprises one of a layer 2 (L2) network address associated with the DCN and a layer 3 (L3) network address associated with the DCN.

6. The method of claim 5, wherein the L2 network address associated with the DCN is a media access control (MAC) address, wherein the L3 network address associated with the DCN is an Internet protocol (IP) address.

7. The method of claim 1, wherein the distributed firewall rule includes (i) a set of n-tuples for comparing with a set of attributes of a packet to determine whether a firewall rule is applicable to the packet, (ii) an action identifier that specifies the action to perform on the packet when the firewall rule is applicable to the packet, and (iii) an enforcement-node tuple that includes the unique identifier.

8. The method of claim 1 further comprising sending a definition of the security tag from the first datacenter to the network controller of the second datacenter to use to identify the unique identifier for the DCN using the security tag.

9. A non-transitory machine readable medium storing a program that when executed by at least one processing unit of a computer in a first datacenter defines and distributes firewall rules for a plurality of data compute nodes (DCNs) executing in a plurality of datacenters, the program comprising sets of instructions for:

associating a unique identifier, for a DCN, in a second datacenter with a security tag, wherein the unique identifier for the DCN is a globally unique identifier across the first and second datacenters;

defining a firewall rule with a reference to the security tag; and distributing the firewall rule with the reference to the security tag from the first datacenter to a network controller at the second datacenter, wherein the network controller at the second datacenter uses the security tag referenced by the distributed firewall rule to identify the unique identifier for the DCN, maps the unique DCN identifier to a local network address associated with the DCN at the second datacenter, uses the local network address to define a matching attribute of a local firewall rule, and defines an action of the distributed firewall rule as an action of the local firewall rule, wherein a firewall enforcing machine at the second datacenter uses the local firewall rule to process packets associated with the DCN in accordance with a firewall action specified by the local firewall rule.

10. The non-transitory machine readable medium of claim 9, the program further comprising sets of instructions for:
associating the security tag with a security group,
wherein the reference to the security tag is a reference to the security group associated with the security tag.

11. The non-transitory machine readable medium of claim 9, wherein even after the DCN moves from the second datacenter to a third datacenter, the unique identifier does not change for the DCN.

12. The non-transitory machine readable medium of claim 9, wherein the unique identifier of the DCN is a universally unique identifier (UUID) of the DCN.

13. The non-transitory machine readable medium of claim 9, wherein the network address associated with the DCN comprises one of a layer 2 (L2) network address associated with the DCN and a layer 3 (L3) network address associated with the DCN.

14. The non-transitory machine readable medium of claim 13, wherein the L2 network address associated with the DCN is a media access control (MAC) address, wherein the L3 network address associated with the DCN is an Internet protocol (IP) address.

15. The non-transitory machine readable medium of claim 9, wherein the distributed firewall rule includes (i) a set of n-tuples for comparing with a set of attributes of a packet to determine whether a firewall rule is applicable to the packet, (ii) an action identifier that specifies the action to perform on the packet when the firewall rule is applicable to the packet, and (iii) an enforcement-node tuple that includes the unique identifier.

16. A non-transitory machine readable medium storing a program that when executed by at least one processing unit of a computer in a first datacenter translates firewall rules for a set of data compute nodes (DCNs) operating in the first datacenter, the program comprising sets of instructions for:

receiving, from a second datacenter, a distributed firewall rule that is defined with a reference to a security tag that is associated with a unique identifier for a DCN in the first datacenter, wherein the unique identifier for the DCN is a globally unique identifier across the first and second datacenters; and translating the distributed firewall rule by using the security tag referenced by the distributed firewall rule to identify the unique identifier for the DCN, mapping the unique DCN identifier to a local network address associated with the DCN at the first datacenter, using the local network address to define a matching attribute of a local firewall rule, and defining an action of the distributed firewall rule as an action of the local firewall rule, wherein a firewall enforcing machine at the first datacenter uses the local firewall rule to process packets associated with the DCN in accordance with a firewall action specified by the local firewall rule.

17. The non-transitory machine readable medium of claim 16, wherein:
the security tag is associated with a security group at the particular datacenter; and the reference to the security tag is a reference to the security group associated with the security tag.

18. The non-transitory machine readable medium of claim 16, wherein even after the DCN moves from the first datacenter to a third datacenter, the unique identifier does not change for the DCN.

19. The non-transitory machine readable medium of claim 16, wherein the unique identifier of the DCN is a universally unique identifier (UUID) of the DCN.

20. The non-transitory machine readable medium of claim 16, wherein the network address associated with the DCN comprises one of a layer 2 (L2) network address associated with the DCN and a layer 3 (L3) network address associated with the DCN.

21. The non-transitory machine readable medium of claim 16, wherein the distributed firewall rule includes (i) a set of n-tuples for comparing with a set of attributes of a packet to determine whether a firewall rule is applicable to the packet, (ii) an action identifier that specifies the action to perform on the packet when the firewall rule is applicable to the packet, and (iii) an enforcement-node tuple that includes the unique identifier.

\* \* \* \* \*